(12) United States Patent
Hinohara et al.

(10) Patent No.: US 10,547,607 B2
(45) Date of Patent: Jan. 28, 2020

(54) MANAGEMENT SYSTEM, PROGRAM, MANAGEMENT METHOD, AND COMMUNICATION SYSTEM

(71) Applicants: Hiroshi Hinohara, Kanagawa (JP); Osamu Takayasu, Kanagawa (JP); Tatsuya Nagase, Kanagawa (JP)

(72) Inventors: Hiroshi Hinohara, Kanagawa (JP); Osamu Takayasu, Kanagawa (JP); Tatsuya Nagase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 19 days.

(21) Appl. No.: 15/308,700

(22) PCT Filed: May 1, 2015

(86) PCT No.: PCT/JP2015/063702
§ 371 (c)(1),
(2) Date: Nov. 3, 2016

(87) PCT Pub. No.: WO2015/174436
PCT Pub. Date: Nov. 19, 2015

(65) Prior Publication Data
US 2017/0214681 A1 Jul. 27, 2017

(30) Foreign Application Priority Data
May 14, 2014 (JP) .................... 2014-100859

(51) Int. Cl.
*H04L 29/06* (2006.01)
*H04M 3/56* (2006.01)
*G06Q 50/18* (2012.01)

(52) U.S. Cl.
CPC ........ *H04L 63/083* (2013.01); *H04L 63/0853* (2013.01); *H04L 65/403* (2013.01); *H04M 3/56* (2013.01); *G06Q 50/184* (2013.01)

(58) Field of Classification Search
CPC ... H04L 63/08; H04L 63/083; H04L 63/0823; H04L 63/0853; H04L 65/403; H04M 3/56; G06Q 50/184
See application file for complete search history.

(56) References Cited

U.S. PATENT DOCUMENTS 8,964,713 B2  2/2015  Hinohara et al.
9,191,428 B2  11/2015  Hinohara et al.
(Continued)

FOREIGN PATENT DOCUMENTS

JP  2008-97419 A  4/2008
JP  2010-98470 A  4/2010
(Continued)

OTHER PUBLICATIONS

Extended European Search Report dated May 15, 2017 in European Patent Application No. 15793432.4.
(Continued)

*Primary Examiner* — Ayoub Alata
(74) *Attorney, Agent, or Firm* — Oblon, McClelland, Maier & Neustadt, L.L.P.

(57) ABSTRACT

A management system for managing at least one function to be executed in a communication terminal. The management system includes a reception unit that receives identification information about the communication terminal from the communication terminal; a storage unit that stores a service period set for each of functions associated with pieces of identification information about communication terminals; a specification unit that specifies, from the functions associated with the received identification information, functions within the service periods; and a transmission unit that transmits function information indicating the specified functions to the communication terminal.

8 Claims, 15 Drawing Sheets

(56) References Cited

U.S. PATENT DOCUMENTS

| | | | |
|---|---|---|---|
| 2002/0069420 A1* | 6/2002 | Russell | G06F 21/10 |
| | | | 725/92 |
| 2012/0137354 A1* | 5/2012 | Okita | G06F 21/31 |
| | | | 726/10 |
| 2014/0240441 A1 | 8/2014 | Hinohara et al. | |
| 2014/0240770 A1 | 8/2014 | Hinohara et al. | |

FOREIGN PATENT DOCUMENTS

| | | | |
|---|---|---|---|
| JP | 2011-154473 | | 8/2011 |
| JP | 2013-125515 | | 6/2013 |
| JP | 2013125515 | * | 6/2013 |
| JP | 2013-141201 | | 7/2013 |
| JP | 2015-133652 | | 7/2015 |

OTHER PUBLICATIONS

International Search Report dated Jul. 14, 2015 in PCT/JP2015/063702 filed on May 1, 2015.
Office Action dated Mar. 6, 2018 in Japanese Patent Application No. 2014-100859, 6 pages.

* cited by examiner

FIG.8

| COMMUNICATION ID | NAME | AUTHENTICATION METHOD |
|---|---|---|
| 01aa | GINZA OFFICE | TERMINAL |
| 02ab | USER A | USER |
| ... | ... | ... |
| 01ba | OMORI OFFICE | TERMINAL |
| 01bb | EBINA OFFICE | TERMINAL |
| ... | ... | ... |

FIG.9

| COMMUNICATION ID | PASSWORD |
|---|---|
| 01aa | 0x0x0x0x |
| 02ab | user_passwd |
| ... | ... |

FIG.10

| FUNCTION ID | FUNCTION NAME | AUTHENTICATION METHOD |
|---|---|---|
| 1 | PHONE CALL APP | TERMINAL, USER |
| 2 | SCREEN SHARING APP | TERMINAL, USER |
| 3 | DEVICE CONNECTION APP | TERMINAL |
| 4 | CHAT APP | USER |
| ... | ... | ... |

| COMMUNICATION ID | FUNCTION ID | SERVICE PERIOD |
|---|---|---|
| 01aa | 1 | 1970/01/01-9999/12/31 |
| 01aa | 2 | 2014/01/25-9999/12/31 |
| 01aa | 3 | 2014/01/25-2014/02/24 |
| 01ab | 1 | 1970/01/01-9999/12/31 |
| 01ab | 2 | 2014/01/25-9999/12/31 |
| 01ab | 3 | 2014/01/25-2014/02/24 |
| 02aa | 1 | 1970/01/01-9999/12/31 |
| 02ab | 1 | 1970/01/01-9999/12/31 |
| 03aa | 4 | 1970/01/01-9999/12/31 |
| 03ab | 4 | 1970/01/01-9999/12/31 |
| ... | ... | ... |

57

| GROUP ID | GROUP NAME | COMMUNICATION ID |
|---|---|---|
| A | COMPANY A | 01aa, 01ab, 02aa, 2ab |
| B | COMPANY B | 03aa, 03ab |
| ... | ... | ... |

58

MANAGEMENT SYSTEM, PROGRAM, MANAGEMENT METHOD, AND COMMUNICATION SYSTEM

TECHNICAL FIELD

The present invention relates to a management system, a program, a management method, and a communication system.

BACKGROUND ART

Conference systems for holding a teleconference with a remote location via a communication network such as the Internet are in common use. According to the conference system, in a conference room where one of parties such as attendees of the teleconference is present, a terminal device of the teleconference system is used to shoot images and collect voice sound of the party of the conference in the conference room. This is converted into digital data and transmitted to a terminal device of another party. The transmitted digital data is displayed on a display screen and voice sound is output from a loudspeaker in a conference room of the other party, thereby holding the teleconference in a manner similar to an actual conference.

Patent Document 1 discloses a feature of obtaining positional information about where a conference terminal accesses a network and dynamically controlling limitation on functions of a Web conference based on the obtained positional information, thereby enhancing security of the Web conference.

Patent Document 2 discloses a program for allowing predetermined users who have been successfully authenticated to install a plug-in that extends functions of a printer driver.

Patent Document 1: Japanese Laid-Open Patent Application No. 2013-141201
Patent Document 2: Japanese Laid-Open Patent Application No. 2011-154473

SUMMARY OF INVENTION

Problem to be Solved by the Invention

There have been demands for controlling details of functions available in each terminal connected to a teleconference system. For example, providers that provide functions available in the terminals wish to sell a license to use the functions for a predetermined period to users of the terminals and wish to control availability of the functions according to the license.

However, according to a technique of related art, it is impossible to control details of functions available in a terminal based on a service period for the functions.

In view of such a problem, it is a general object of the present invention to efficiently control availability of the functions of the terminal used for a teleconference.

Means to Solve the Problem

According to an aspect of the invention, a management system for managing at least one function to be executed in a communication terminal is provided. The management system includes a reception unit that receives identification information about the communication terminal from the communication terminal; a storage unit that stores a service period set for each of functions associated with pieces of identification information about communication terminals; a specification unit that specifies, from the functions associated with the received identification information, functions within the service periods; and a transmission unit that transmits function information indicating the specified functions to the communication terminal.

According to an aspect of the invention, it is possible to efficiently control availability of functions of a terminal used in a teleconference.

BRIEF DESCRIPTION OF DRAWINGS

FIG. 8 is a conceptual diagram showing a terminal management table;
FIG. 9 is a conceptual diagram showing an authentication table;
FIG. 10 is a conceptual diagram showing a function management table;
FIG. 11 is a conceptual diagram showing a service period management table.

BEST MODE FOR CARRYING OUT THE INVENTION

In the following, embodiments for carrying out the present invention are described with reference to the accompanying drawings.

<<Entire Configuration>>

Figure 1:
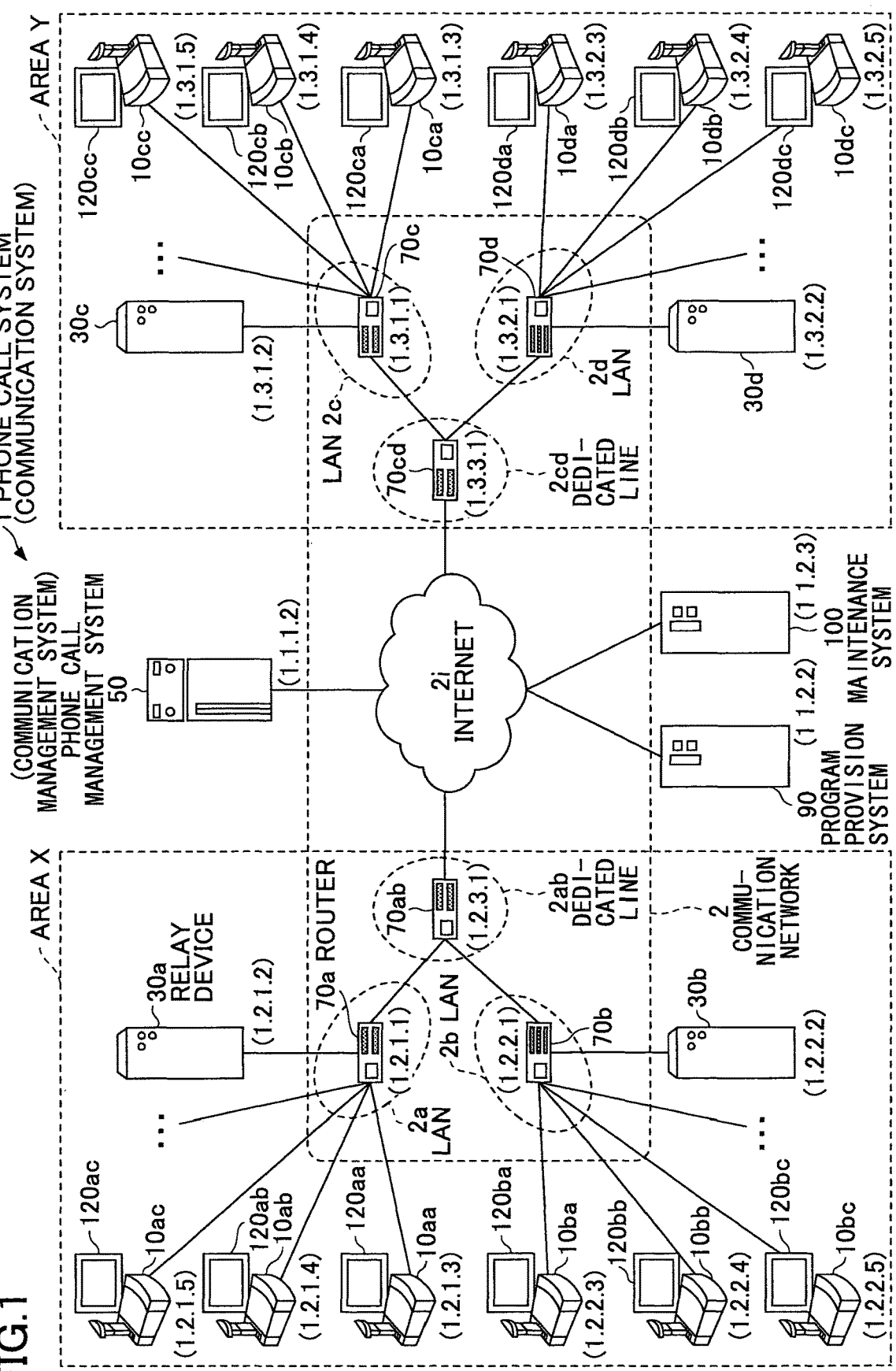
FIG. 1 is a schematic diagram of a phone call system according to an embodiment of the present invention.

FIG. 1 is a schematic diagram of a phone call system (communication system) 1 used in an embodiment of the present invention. As shown in FIG. 1, the phone call system 1 includes a plurality of terminals or communication terminals (10*aa*, 10*ab* . . . ) and a plurality of display screens (120*aa*, 120*ab* . . . ) for the respective terminals (10*aa*, 10*ab* . . . ). The phone call system 1 further includes a plurality of relay devices (30*a*, 30*b*, 30*c*, 30*d*), a phone call management system 50, a program provision system 90, and a maintenance system 100. When the phone call system 1 performs communication of image data and sound data as an example of phone call data, it is possible to realize a video conference and the like in remote places. A plurality of routers (70*a*, 70*b*, 70*c*, 70*d*, 70*ab*, 70*cd*) select an optimum route for phone call data.

The terminals (10*aa*, 10*ab*, 10*ac* . . . ), the relay device 30*a*, and the router 70*a* are communicatively connected by a LAN 2*a*. The terminals (10*ba*, 10*bb*, 10*bc* . . . ), the relay device 30*b*, and the router 70*b* are communicatively connected by a LAN 2*b*. The LAN 2*a* and the LAN 2*b* are communicatively connected by a dedicated line 2*ab* including the router 70*ab*. Further, the LAN 2*a*, the LAN 2*b*, and the dedicated line 2*ab* are built in a predetermined area X. For example, the area X is China, the LAN 2*a* is built in an office of Beijing, and the LAN 2*b* is built in an office of Shanghai.

In another area, terminals (10*ca*, 10*cb*, 10*cc* . . . ), the relay device 30*c*, and the router 70*c* are communicatively connected by a LAN 2*c*. Terminals (10*da*, 10*db*, 10*dc* . . . ), the relay device 30*d*, and the router 70*d* are communicatively connected by a LAN 2*d*. The LAN 2*c* and the LAN 2*d* are communicatively connected by a dedicated line 2*cd* including the router 70*cd*. Further, the LAN 2*c*, the LAN 2*d*, and the dedicated line 2*cd* are built in a predetermined area Y. For example, the area Y is the U.S., the LAN 2*c* is built in an office of New York, and the LAN 2*d* is built in an office of Washington D.C. The area X and the area Y are communicatively connected from the routers (70*ab*, 70*cd*) on the Internet 2*i*.

In the following, the "terminals" are simply described as a "terminal" and the "phone call management system" is described as a "management system". Any one of the terminals (10*aa*, 10*ab* . . . ) is described as a "terminal 10". Any one of the display screens (120*aa*, 120*ab* . . . ) is described as a "display screen 120". Any one of the relay devices (30*a*, 30*b* . . . ) is described as a "relay device 30". A terminal that sends a request to start a video conference is described as a "requestor" and a terminal (relay destination) to which the request is addressed is described as a "destination". Any one of the routers (70*a*, 70*b* . . . ) is described as a "router 70". A phone call is realized using sound, video (images), or the sound and the video (images).

The phone call management system 50, the program provision system 90, and the maintenance system 100 are connected to the Internet 2*i*. The phone call management system 50, the program provision system 90, and the maintenance system 100 may be disposed in the area X, the area Y, or another area.

In the present embodiment, a communication network 2 is built using the LAN 2*a*, the LAN 2*b*, the dedicated line 2*ab*, the Internet 2*i*, the dedicated line 2*cd*, the LAN 2*c*, and the LAN 2*d*. This communication network 2 may include not only a part where cable communication is performed but also a part where wireless communication is performed by Wireless Fidelity (WiFi), Bluetooth (registered trademark), or the like.

In FIG. 1, four digits described under each terminal 10, each relay device 30, the phone call management system 50, each router 70, the program provision system 90, and the maintenance system 100 indicate IPv4 addresses in a simplified manner. For example, the IP address of the terminal 10*aa* is represented as "1.2.1.3". While IPv6 may be used instead of IPv4, IPv4 is used in order to simplify description.

Each terminal 10 may be used not only for a phone call between offices and a phone call between different rooms in the same office but also for a phone call in the same room and a phone call between an outdoor location and an indoor location or between an outdoor location and another outdoor location. If the terminal 10 is used outdoors, wireless communication in a mobile phone network or the'like is performed.

Each terminal 10 shown in FIG. 1 is a terminal for realizing a user's phone call by transmitting and receiving phone call data. Examples of the terminal 10 include a video conference terminal. The terminal 10 transmits and receives phone call data using predetermined communication methods (a call control method for connecting to a phone call address or disconnecting communication and an encoding method for IP-packetizing phone call data).

The followings are examples of the call control method.
(1) Session Initiation Protocol (SIP)
(2) H.323
(3) Extended SIP
(4) Instant Messenger Protocol
(5) MESSAGE method of SIP
(6) Internet Relay Chat (IRC) Protocol
(7) Extended Instant Messenger Protocol The Instant Messenger Protocol in (4) is used in (4-1) Extensible Messaging and Presence Protocol (XMPP) or (4-2) ICQ (registered trademark), AIM (registered trademark), or Skype (registered trademark), for example. Further, the Extended Instant Messenger Protocol in (7) is used in Jingle, for example.

In the terminal 10, a plurality of phone call applications to realize a phone call are installed before factory shipment. An application may be added to the terminal 10 even after shipment by a user operation or an update of the terminal 10. In the following, an application is abbreviated as an "app".

When more than one of the terminals 10 use the same phone call app, it is possible to realize a phone call via the communication network 2. Phone call apps include call and messaging apps. Examples of the call and messaging apps include Skype, Google Talk, LINE, FaceTime, Kakao Talk, and Tango (registered or non-registered trademark) in addition to phone call apps for a video conference.

Figure 2:
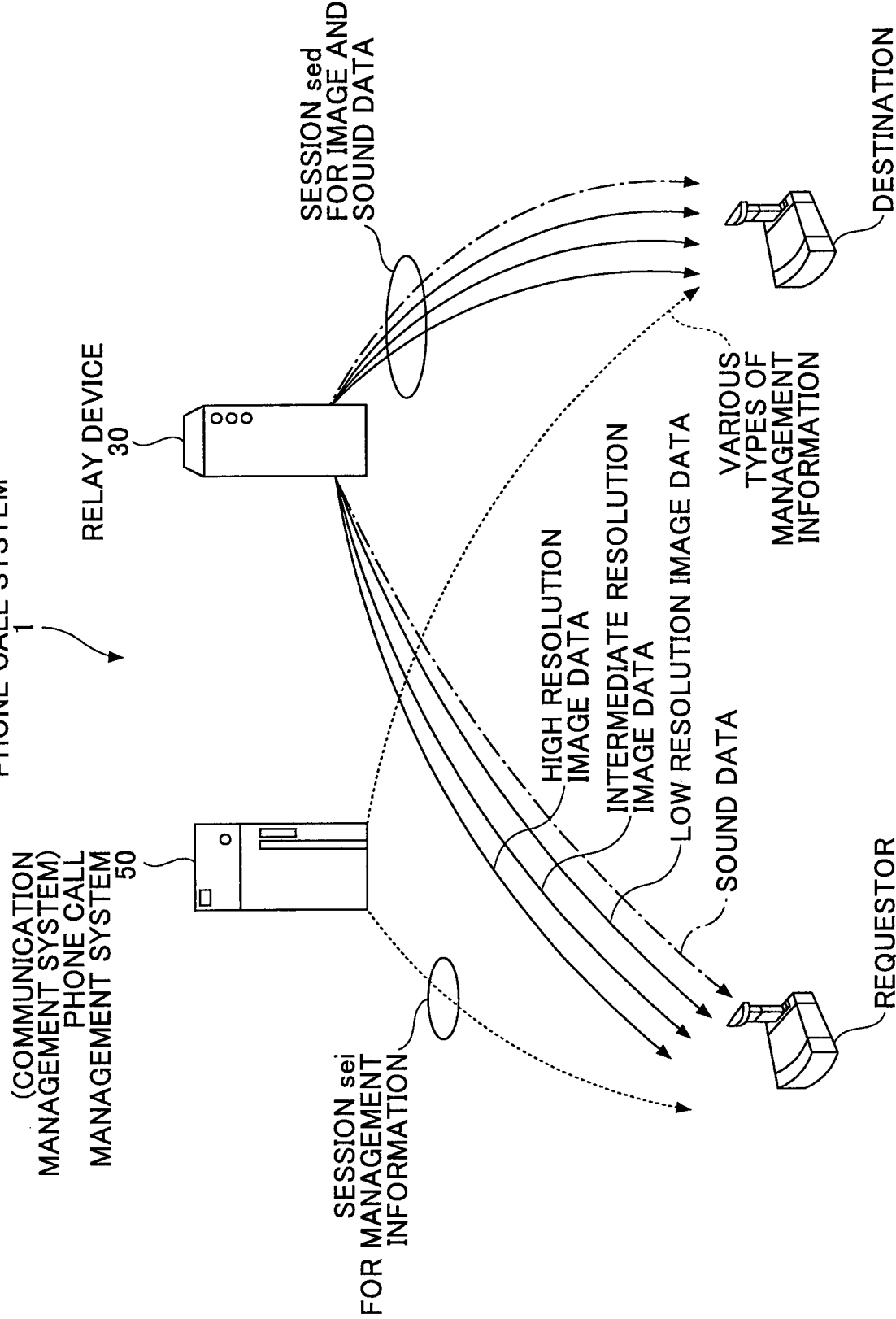
FIG. 2 is a conceptual diagram showing a communication state when a phone call is realized between terminals.

As shown in FIG. 2, in the phone call system 1, a session sei for management information to transmit and receive various types of management information is established between the requestor and the destination via the phone call management system 50. Further, four sessions to transmit and receive four types of data, namely, high resolution image data, intermediate resolution image data, low resolution image data, and sound data are established between the requestor and the destination via, the relay device 30. These four sessions are collectively referred to as a session sed for image and sound data. Image data may not be separated based on resolution but may be transmitted or received in a single session.

In the following, resolution of an image of image data is described. The image of the image data includes the following.
(1) An image of low resolution used as a base image including 160 pixels in a horizontal direction and 120 pixels in a vertical direction as shown in FIG. 3A.
(2) An image of intermediate resolution including 320 pixels in a horizontal direction and 240 pixels in a vertical direction as shown in FIG. 3B.

Figure 3C:
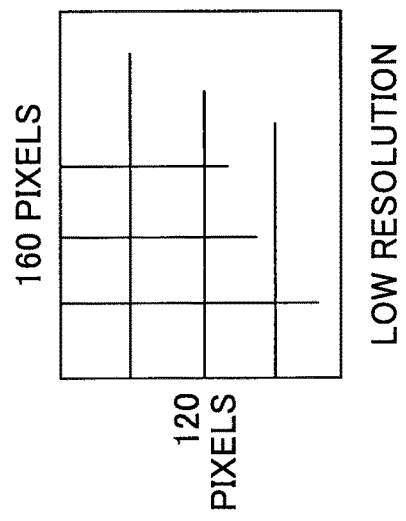
FIG. 3C is a conceptual diagram showing image quality of image data transmitted or received based on an SVC standard in FIG. 2.
Figure 3B:
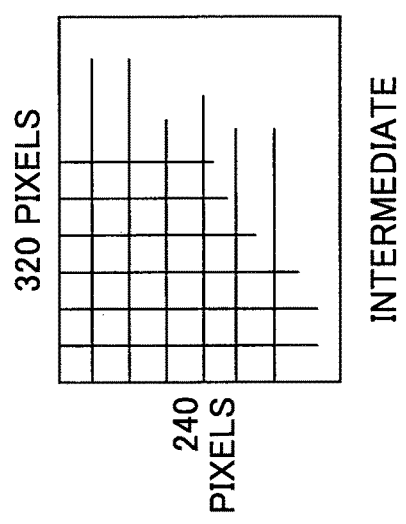
FIG. 3B is a conceptual diagram showing image quality of image data transmitted or received based on an SVC standard in FIG. 2.
Figure 3A:
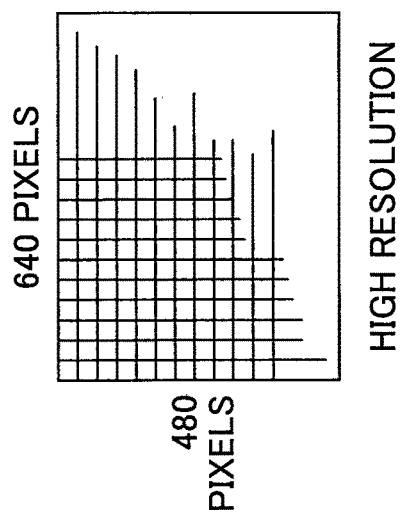
FIG. 3A is a conceptual diagram showing image quality of image data transmitted or received based on an SVC standard in FIG. 2.

(3) An image of high resolution including 640 pixels in a horizontal direction and 480 pixels in a vertical direction as shown in FIG. 3C.

If image data is transmitted or received via a narrow-band path, image data of low image quality including only image data of low resolution used as the base image is relayed. If a band is relatively wide, image data of intermediate image quality including the image data of low resolution used as the base image and image data of intermediate resolution is relayed. Further, if the band is substantially wide, image data of high image quality including the image data of low resolution used as the base image, the image data of intermediate resolution, and image data of high resolution is relayed. Since sound data has a smaller data volume compared with the image data, the sound data is relayed in the communication network 2 in any one of the above-mentioned cases where the narrow-band path is used, the band is relatively wide, and the band is substantially wide.

<<Hardware Configuration of Embodiment>>

Figure 4:
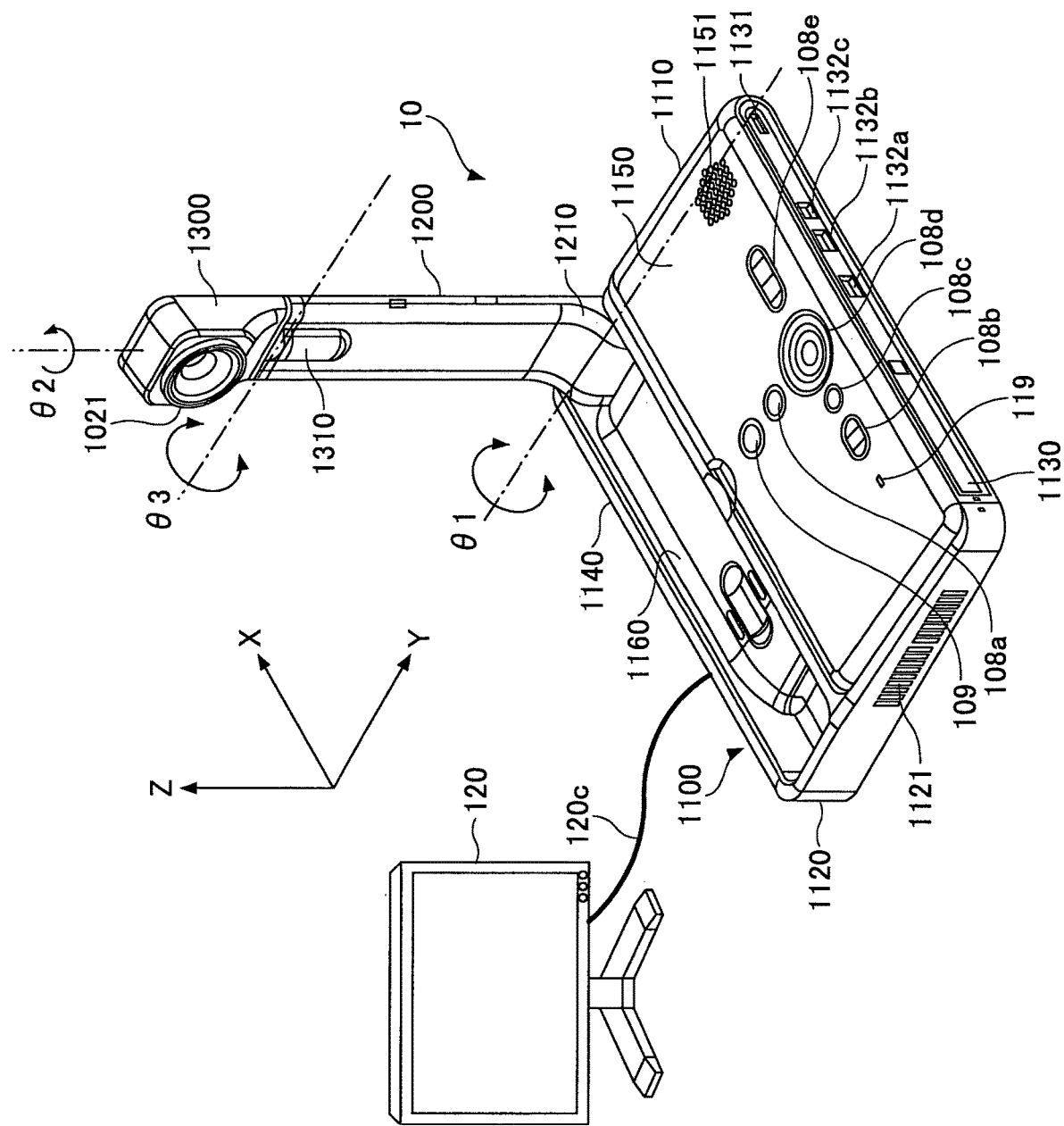
FIG. 4 is an external view of a terminal.

A hardware configuration of the present embodiment is described. FIG. 4 is an external view of the terminal 10 according to the present embodiment. As shown in FIG. 4, the terminal 10 includes a case 1100, an arm 1200, and a camera housing 1300. The case 1100 has a front wall surface 1110 where an air intake surface (not shown) formed by a plurality of air intake holes are disposed. The case 1100 also has a rear wall surface 1120 where an air outlet surface 1121 formed by a plurality of air outlet holes are disposed. In accordance with these surfaces, by driving a cooling fan built in the case 1100, it is possible to take in external air in front of the terminal 10 via the air intake surface (not shown) and discharge the air backward from the terminal 10 via the air outlet surface 1121. The case 1100 has a right wall surface 1130 where a sound collection hole 1131 is formed and a built-in microphone 114 to be described later is capable of collecting voice sound, other sound, and noise.

An operation panel 1150 is formed on a right wall surface side of a top surface of the case 1100. On the operation panel 1150, a plurality of operation buttons (108a-108e), a power supply switch 109, and an alarm lamp 119 to be described later are disposed. Further, on the operation panel 1150, a sound output surface 1151 formed by a plurality of voice output holes for issuing output sound from a built-in loudspeaker 115 to be described later is disposed. On a left wall surface side of the top surface of the case 1100, a housing section 1160 for housing the arm 1200 and the camera housing 1300 is formed as a concave portion. On the right wall surface 1130 of the case 1100, a plurality of connection ports (1132a-1132c) for electrically connecting a cable to an external device connection I/F 118 to be described later is formed. On a left wall surface 1140 of the case 1100, a connection port (not shown) for electrically connecting a cable 120c for the display screen 120 to the external device connection I/F 118 is formed.

In the following, any one of the operation buttons (108a-108e) is described as an "operation button 108" and any one of the connection ports (1132a-1132c) is described as a "connection port 1132".

The arm 1200 is installed on the case 1100 via a torque hinge 1210. The arm 1200 is configured rotatably in upper and lower directions within a range of 135 degrees as a tilt angle θ1 relative to the case 1100. FIG. 4 shows a case where the tilt angle θ1 is 90 degrees. The camera housing 1300 has a built-in camera 112 to be described later and can shoot images of a user, a document, a room, and the like. On the camera housing 1300, a torque hinge 1310 is formed. The camera housing 1300 is installed on the arm 1200 via the torque hinge 1310. The camera housing 1300 is configured rotatably in right and left directions within a range of ±180 degrees as a pan angle θ2 and in upper and lower directions within a range of ±45 degrees as a tilt angle θ3 relative to the arm 1200 based on a state shown in FIG. 4 as a zero degree.

The external view of FIG. 4 is only an example and an appearance is not limited to this. The terminal 10 may be a personal computer (PC), a smartphone, a tablet terminal, an electronic blackboard, a projection device such as a video projector, a car navigation terminal installed on an automobile, or the like that is generally used. The camera and the microphone may not be of a built-in type but may be externally attached. The terminal 10 may include a built-in display screen or the terminal 10 may project an image on a screen or the like instead of displaying the image on the display screen.

A description of appearances of the phone call management system 50, the program provision system 90, and the maintenance system 100 is omitted because these appearances are the same as an appearance of a general-purpose server computer.

Figure 5:
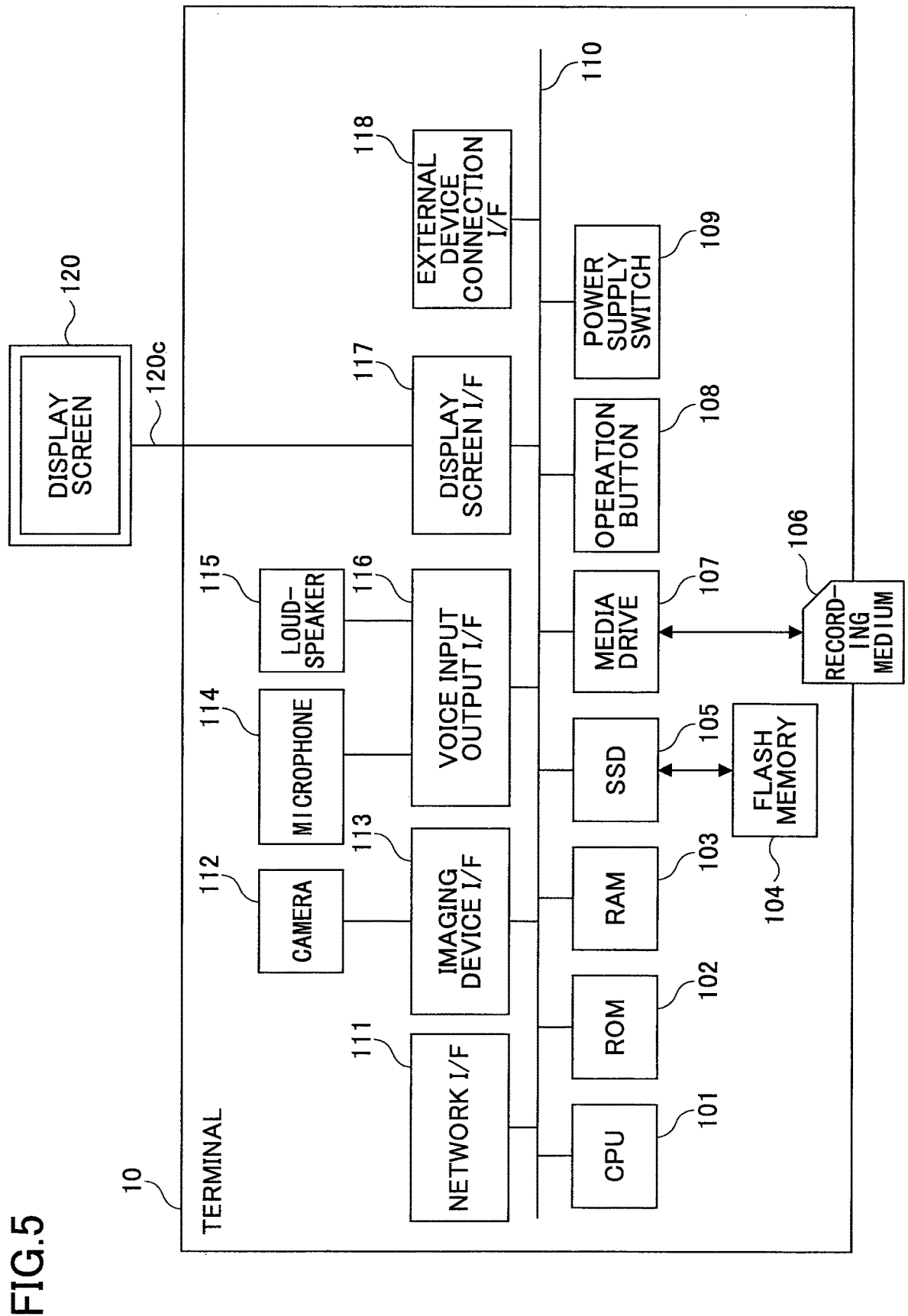
FIG. 5 is a configuration diagram illustrating hardware of a terminal.

FIG. 5 is a configuration diagram illustrating hardware of the terminal 10 according to the present embodiment. As shown in FIG. 5, the terminal 10 of the present embodiment includes a Central Processing Unit (CPU) 101 that controls an entire operation of the terminal 10; a Read Only Memory (ROM) 102 that stores a program such as an Initial Program Loader (IPL) used to drive the CPU 101; a Random Access Memory (RAM) 103 used as a work area of the CPU 101; a flash memory 104 that stores various types of data such as a program for the terminal 10, image data, and voice data; a Solid State Drive (SSD) 105 that controls reading or writing of various types of data into the flash memory 104 in accordance with control of the CPU 101; a media drive 107 that controls reading or writing (storage) of data into a recording medium 106 such as a flash memory; the operation button 108 that is operated when an address of the terminal 10 is selected, for example; the power supply switch 109 for switching ON/OFF a power supply for the terminal 10; and a network interface (I/F) 111 for transmitting data using the communication network 2.

The terminal 10 further includes the built-in camera 112 that shoots images of an object to obtain image data in accordance with control of the CPU 101; an imaging device I/F 113 that controls driving of the built-in camera 112; the built-in microphone 114 that inputs voice sound; the built-in loudspeaker 115 that outputs voice sound; a voice input and output I/F 116 that processes input and output of voice signals between the microphone 114 and the loudspeaker 115 in accordance with control of the CPU 101; a display screen I/F 117 that transmits image data in accordance with control of the CPU 101 to the display screen 120 that is externally attached; the external device connection I/F 118 for connecting various types of external devices; the alarm lamp 119 that reports abnormality of various types of functions of the terminal 10; and a bus line 110 such as an address bus or a data bus for electrically connecting the above-mentioned constituent elements as shown in FIG. 5.

The display screen 120 is a display unit configured with liquid crystal or organic electroluminescence (EL) for displaying images of a subject, operation, or the like. The display screen 120 is connected to the display screen I/F 117 via the cable 120c. The cable 120c may be a cable for analogue RGB (VGA) signals or a cable for component video signals. Further, the cable 120c may be a cable for High-Definition Multimedia Interface (HDMI) (registered trademark) signals or a cable for Digital Video Interactive (DVI) signals.

The camera 112 includes a lens and a solid-state image sensing device for converting light into an electric charge to digitalize the images (video) of the subject. Examples of the solid-state image sensing device include a Complementary Metal Oxide Semiconductor (CMOS) and a Charge Coupled Device (CCD).

An external camera, an external microphone, an external loudspeaker, and the like are connected to the external device connection I/F 118 via a Universal Serial Bus (USB) cable inserted into the connection port 1132 of the case 1100 shown in FIG. 4. If the external camera is connected, the external camera is driven preferentially over the built-in camera 112 in accordance with control of the CPU 101. In the same manner, if the external microphone or the external loudspeaker is connected, the external microphone or the external loudspeaker is driven preferentially over the built-in microphone 114 or the built-in loudspeaker 115 in accordance with control of the CPU 101.

The recording medium 106 is configured to be detachable for the terminal 10. The recording medium 106 may be a non-volatile memory for reading or writing data in accordance with control of the CPU 101. The recording medium 106 is not limited to the flash memory 104. The recording medium 106 may be an Electrically Erasable and Programmable ROM (EEPROM), for example.

Figure 6:
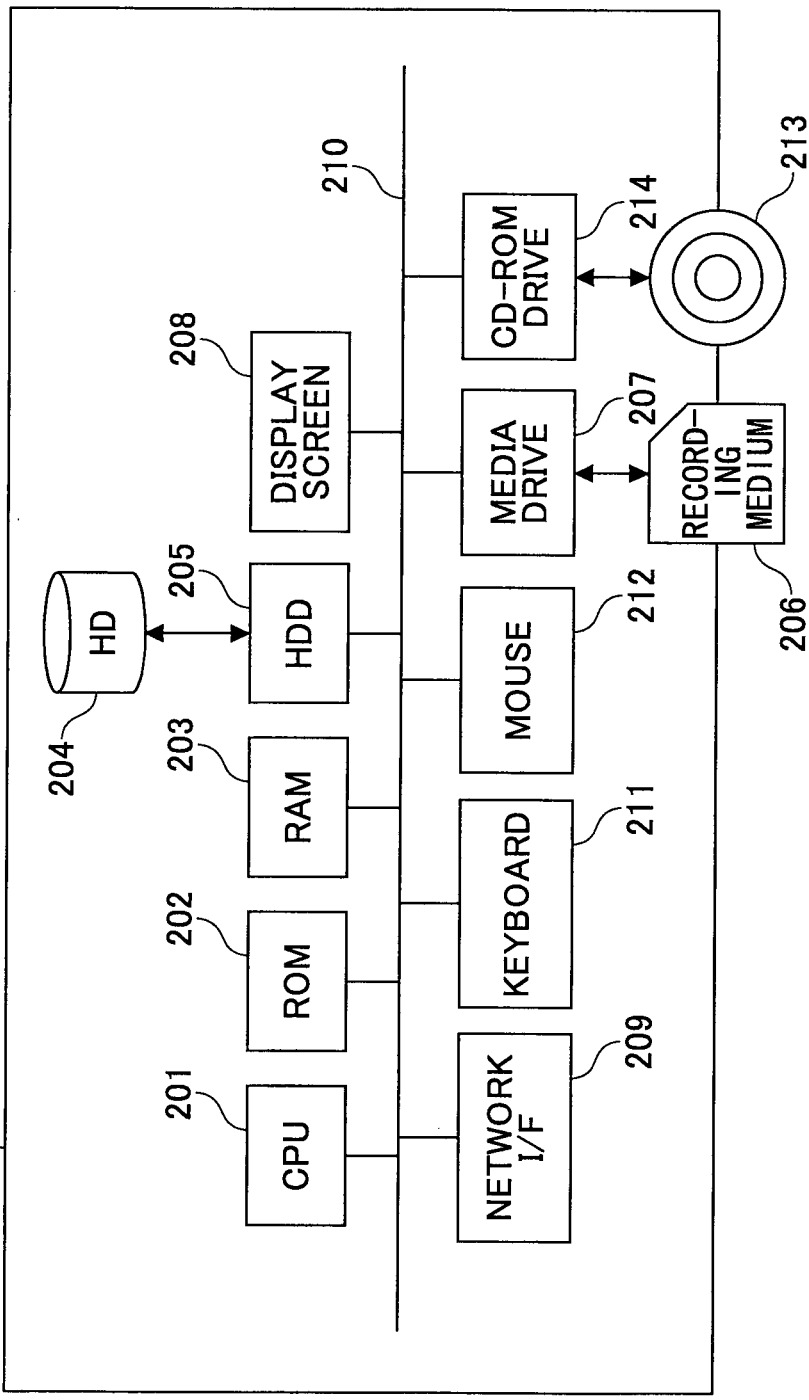
FIG. 6 is a configuration diagram illustrating hardware of a phone call management system and a relay device.

FIG. 6 is a configuration diagram illustrating hardware of the phone call management system 50 according to the present embodiment of the present invention. The phone call management system 50 includes a CPU 201 that controls an entire operation of the phone call management system 50; a ROM 202 that stores a program such as an IPL used to drive the CPU 201; a RAM 203 used as a work area of the CPU 201; a hard disk (HD) 204 that stores various types of data such as a program for the phone call management system 50; a Hard Disk Drive (HDD) 205 that controls reading or writing of various types of data into the HD 204 in accordance with control of the CPU 201; a media drive 207 that controls reading or writing (storage) of data into a recording medium 206 such as a flash memory; a display screen 208 that displays various types of information such as a cursor, a menu, a window, characters, and an image; a network interface (I/F) 209 for transmitting data using the communication network 2; a keyboard 211 including a plurality of keys for inputting characters, numerical values, and various types of instructions; a mouse 212 for selecting or executing various types of instructions, selecting a processing object, and moving the cursor; a CD-ROM drive 214 that controls reading or writing of various types of data into a Compact Disc Read Only Memory (CD-ROM) as an example of a removable recording medium; and a bus line 210 such as an address bus or a data bus for electrically connecting the above-mentioned constituent elements as shown in FIG. 6.

A description of hardware configurations of the relay device 30, the program provision system 90, and the maintenance system 100 is omitted because these hardware configurations are the same as the hardware configuration of the phone call management system 50.

<<Configuration Example of Phone Call System>>

Figure 7:
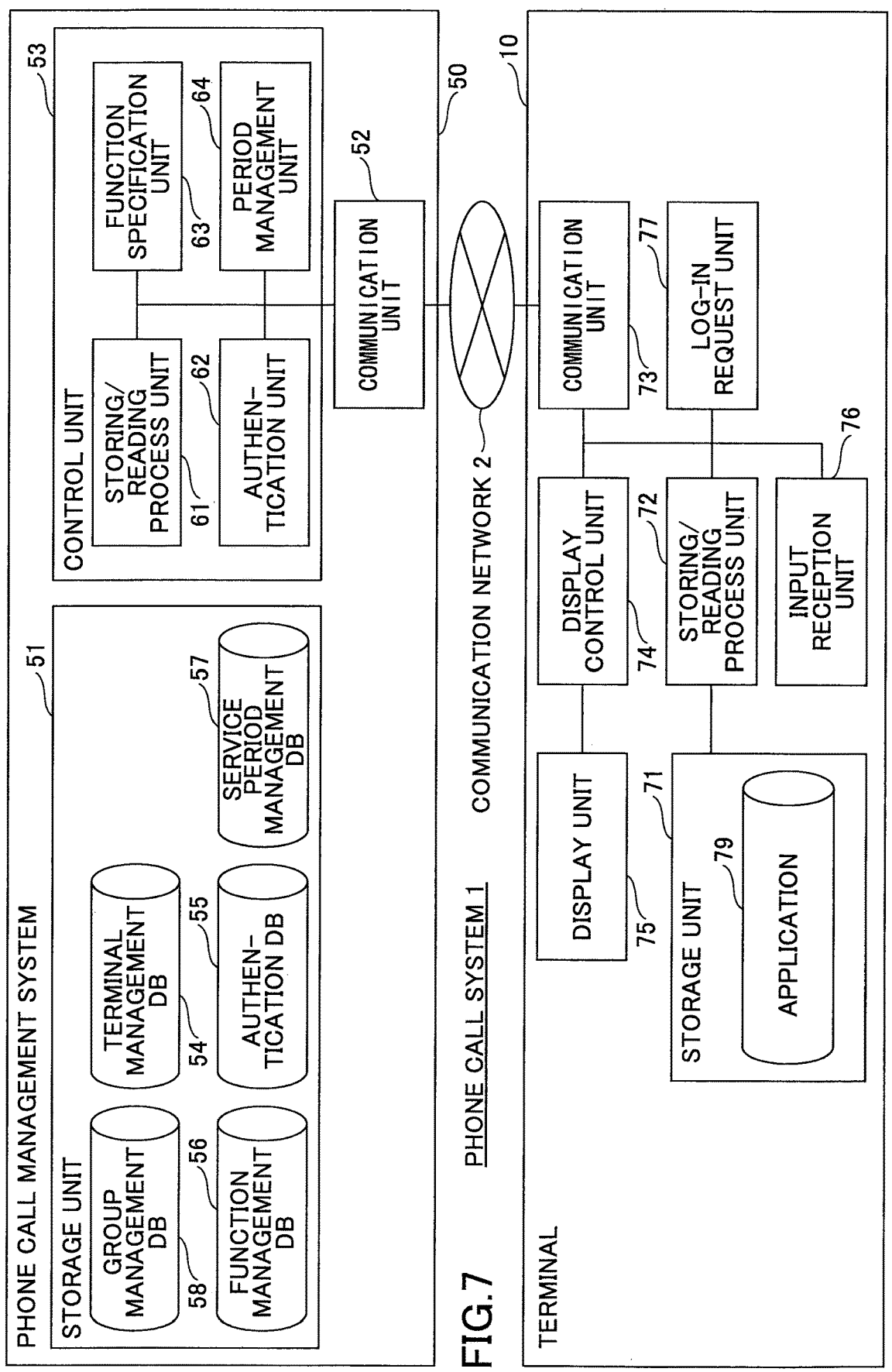
FIG. 7 is a functional block diagram of a phone call management system and a terminal according to an embodiment of the present invention.

FIG. 7 shows a configuration of the phone call system 1 shown in FIG. 1. In the present embodiment, each terminal 10 has at least one application for realizing a function such as a phone call function or a screen sharing function. A user of the terminal 10 can use each function by obtaining authority (license) to use a corresponding application where necessary. Each application may be installed on each terminal 10 in advance or the user may download and install the application where necessary.

For each terminal 10, the phone call management system 50 manages applications available on the terminal 10 and a service period that allows the terminal 10 to use a relevant application. For example, when the terminal 10 starts up or logs into the phone call system 1, the terminal 10 receives a list of available applications from the phone call management system 50. A user of the terminal 10 can select and execute only those available applications. In accordance with this, it is possible to efficiently control availability of functions of the terminal 10.

<<Functions>>

In the following, functions of the phone call management system 50 and the terminal 10 according to the embodiment of the present invention are described with reference to FIG. 7.

<<Functions of Phone Call Management System>>

The phone call management system 50 according to the embodiment of the present invention includes a storage unit 51, a communication unit 52, and a control unit 53.

The storage unit 51 is realized by the HD 204, the HDD 205, and the like shown in FIG. 6. The storage unit 51 includes a terminal management DB 54, an authentication DB 55, a function management DB 56, a service period management DB 57, and a group management DB 58.

The terminal management DB 54 has a terminal management table shown in FIG. 8. The terminal management table stores a communication ID assigned to the terminal or the user of the terminal as identification information, a name of the terminal or the user, and an authentication method used to authenticate the communication ID, each being associated with one another.

The communication ID and the name are represented by a combination of characters, numbers, and symbols, for example. The authentication method is used to authenticate the terminal or the user that tries to log in by using a certain communication ID. The authentication method is based on a "terminal" or a "user". If the terminal 10 is a conference-only terminal as shown in FIG. 4, a "terminal" authentication method is used. If the terminal 10 is a general-purpose terminal such as a PC or a smartphone, a "user" authentication method is used.

The authentication DB 55 has an authentication table shown in FIG. 9. The authentication table stores the above-mentioned communication ID and a password set in advance for the communication ID, each being associated with the other. The password is represented by a combination of characters, numbers, and symbols, for example.

The function management DB 56 has a function management table shown in FIG. 10. The function management table stores a function ID assigned to each function (application) as identification information, a function name that represents a name of the function, and an authentication method to be used for the function, each being associated with one another.

The function ID and the function name are represented by a combination of characters, numbers, and symbols, for example. The authentication method has items corresponding to those items included in the terminal management table shown in FIG. 8 and the authentication method is used as a condition to determine whether the authenticated terminal 10 can use a relevant function.

In the example shown in FIG. 10, a "phone call app" whose function ID is "1" becomes available if its authentication method is based on the "terminal" or the "user"

(namely, if the terminal 10 is a general-purpose terminal). Further, a "Device connection app" whose function ID is "3" becomes available if its authentication method is based on the "terminal" (namely, if the terminal 10 is a dedicated terminal).

Examples of applications that provide functions include the following.

Phone call app: an application to make a phone call to another terminal using voice and/or a video. The Phone call app may also be represented as Remote conference app, for example.

Screen sharing app: an application to share a screen with another terminal.

Device connection app: an application to have a teleconference with a conference terminal manufactured by another company or a conference terminal of a different type using a method different from the one used in the phone call system 1. This app requires a higher processing capability because the app needs a process to convert a communication method unlike the phone call system 1. A specific example of the Device connection app may be represented as Video Conference Gateway, for example.

Chat app: an application to have a chat with another terminal. Since this app requires an input unit such as a keyboard, it is impossible to execute the app if the terminal 10 has a dedicated case as shown in FIG. 4.

Applications that can be executed by the terminal 10 are not limited to these examples.

By determining availability of a function using its authentication method, an application that requires a certain processing capability for execution ("Device connection app", for example) can be, made available only in a dedicated terminal having such a certain processing capability. Further, an application that requires specific hardware (an input unit such as a keyboard) to use the application ("Chat app", for example) can be made available only in a general-purpose terminal having such hardware.

The service period management DB 57 has a service period management table shown in FIG. 11. The service period management table stores a communication ID, a function ID of a function to be made available for the communication ID, and a service period indicating a time period during which the function can be used, those being associated with one another. The terminal 10 having a certain communication ID can use a function (application) having a function ID specified as an item of the function ID in the service period management table only for the service period thereof. In addition, if a sufficiently long period such as "1970/01/01-9999/12/31" is set in the service period, this indicates that the terminal 10 can substantially use the function without limit.

Figures 12, 13:
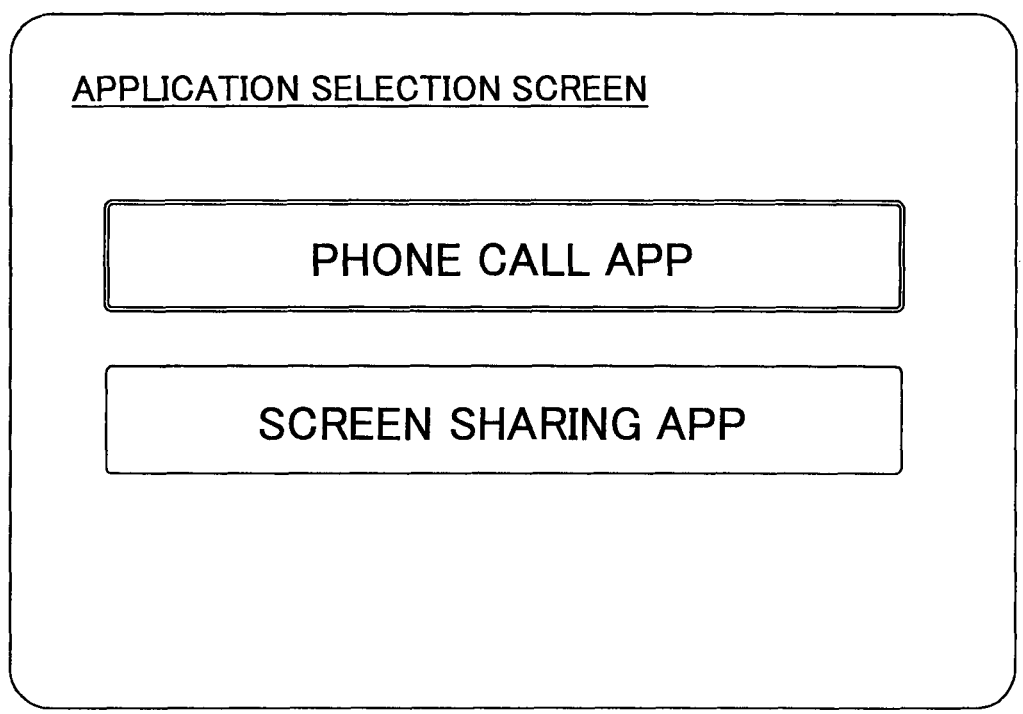
FIG. 12 is a conceptual diagram showing a group management table.
FIG. 13 is a diagram showing a screen to select available applications.

The group management DB 58 has a group management table shown in FIG. 12. The group management table stores a group ID that associates a plurality of communication IDs as identification information about a group, a group name indicating a name of the group, and the communication IDs that belong to the group, those being associated with one another.

The communication unit 52 shown in FIG. 7 is realized by the network I/F 209, for example, shown in FIG. 6. The communication unit 52 can transmit and receive data to and from the terminal 10 via the communication network 2.

The control unit 53 is mainly realized by processes of the CPU 201 shown in FIG. 6 and controls operations of the phone call management system 50. The control unit 53 includes a storing/reading process unit 61, an authentication unit 62, a function specification unit 63, and a period management unit 64.

The storing/reading process unit 61 reads data from the storage unit 51 and stores data in the storage unit 51.

The authentication unit 62 receives a log-in request along with a pair of a communication ID and a password from the terminal 10 via the communication unit 52. The authentication unit 62 authenticates the terminal 10 by comparing the pair with a pair registered with the authentication DB 55. If the pair of the communication ID and the password received from the terminal 10 matches the pair registered with the authentication DB 55, the authentication unit 62 determines that the authentication is a success. If the pair of the communication ID and the password received from the terminal 10 does not correspond to the pair registered with the authentication DB 55, the authentication unit 62 determines that the authentication is a failure.

When the authentication unit 62 determines that the authentication is a success, the authentication unit 62 reports the success to the function specification unit 63 and sends the communication ID and an authentication method ("terminal" or "user") used for the authentication to the function specification unit 63. The authentication unit 62 can specify the authentication method corresponding to the communication ID by referring to the terminal management DB 54.

The authentication unit 62 also transmits an authentication result indicating whether the authentication is a success or a failure to the terminal 10 that transmitted the log-in request. If the authentication is a success, the authentication unit 62 receives a function name from the function specification unit 63. The authentication unit 62 transmits the received function name along with the authentication result to the terminal 10.

When the function specification unit 63 receives the report that the authentication of the terminal 10 is a success, the communication ID, and the authentication method from the authentication unit 62, the function specification unit 63 specifies functions available for the terminal 10. Specifically, the function specification unit 63 first obtains the current date. Then the function specification unit 63 refers to the service period management DB 57 to specify, from function IDs associated with the received communication ID, function IDs that include the current date in their service periods. The function specification unit 63 further refers to the function management DB 56 to specify function names associated with the specified function IDs. The function specification unit 63 sends the specified function names to the authentication unit 62.

Further, after the function specification unit 63 has specified the function IDs, the function specification unit 63 may refer to the function management DB 56 to further specify, from the specified function IDs, those function IDs associated with the authentication method received from the authentication unit 62. Then the function specification unit 63 specifies function names associated with the further specified function IDs. The function specification unit 63 sends the specified function names to the authentication unit 62. In accordance with this process, it is possible to prevent names of functions that cannot be executed by the terminal 10 in practice from being transmitted to the terminal 10.

The period management unit 64 manages a service period of each function for the terminal 10. The period management unit 64 can receive a setting of the service period of each function for the terminal 10 from an administrator of the application or an administrator of the phone call management system 50 via a screen as shown in FIG. 14, for example.

Figure 14:
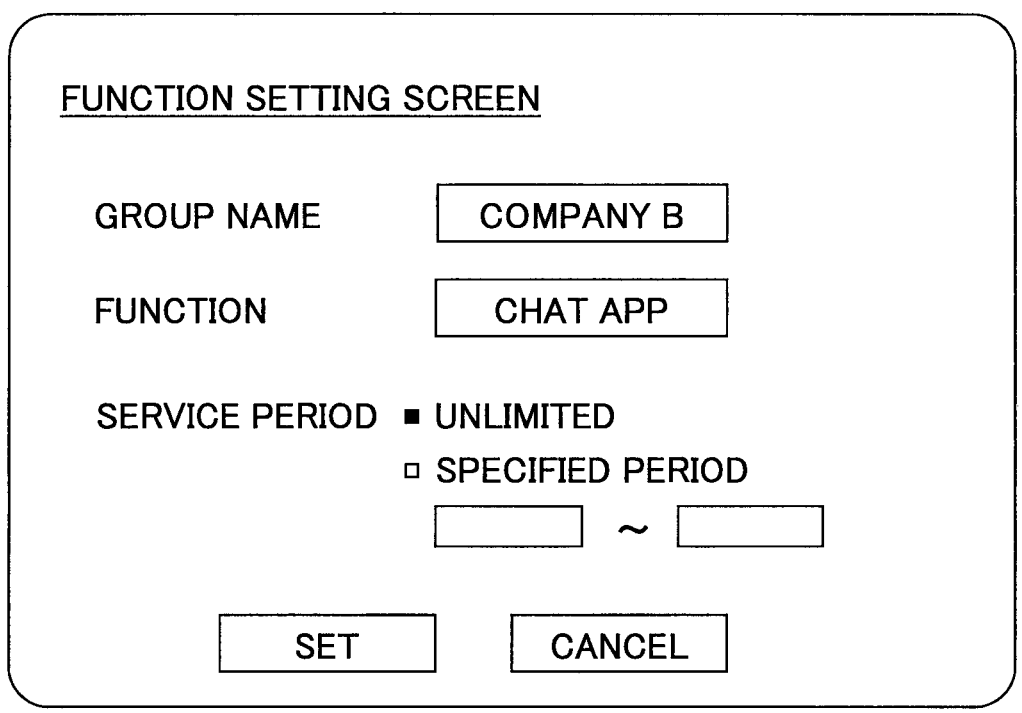
FIG. 14 is a diagram showing a screen to set a service period.

In the example of FIG. 14, each function and the service period thereof are specified based on a group rather than each terminal 10. The group and the terminals 10 constituting the group are managed by the group management DB 58 as mentioned above. The function and the service period are not limited to the example of FIG. 14. An available function and a service period thereof may be set for each terminal 10.

Functions of the above-mentioned phone call management system 50 may serve as a platform of other programs operating in the phone call management system 50.

<<Functions of Terminal>>

The terminal 10 shown in FIG. 7 according to the embodiment of the present invention includes a storage unit 71, a storing/reading process unit 72, a communication unit 73, a display control unit 74, a display unit 75, an input reception unit 76, and a log-in request unit 77.

The storage unit 71 is realized by the ROM 102, the flash memory 104, or the SSD 105 shown in FIG. 5. The storage unit 71 stores a program and data necessary for operations of the terminal 10 and an application (program) 79 for realizing the above-mentioned function.

The storing/reading process unit 72 is mainly realized by processes of the CPU 101 shown in FIG. 5. The storing/reading process unit 72 reads data from the storage unit 71 and stores data in the storage unit 71.

The communication unit 73 is realized by the network I/F 111 shown in FIG. 5. The communication unit 73 can transmit and receive data to and from the phone call management system 50 via the communication network 2.

The display control unit 74 is realized by processes of the CPU 101 and the display screen I/F 117 shown in FIG. 5. The display control unit 74 controls a screen displayed on the display unit 75.

The display unit 75 is realized by the display screen 120 shown in FIG. 5. The display unit 75 displays a screen in accordance with control of the display control unit 74.

The input reception unit 76 is realized by the operation button 108 shown in FIG. 5. The input reception unit 76 receives an input operation from a user.

The log-in request unit 77 is realized by processes of the CPU 101 shown in FIG. 5. The log-in request unit 77 transmits a log-in request to the phone call management system 50 in response to a startup of the terminal 10 or a startup of a teleconference application by the user.

If the terminal 10 is a conference-only terminal having the case 1100 shown in FIG. 4, the log-in request unit 77 transmits a communication ID and a password set in advance for the terminal 10 as terminal-specific identification information along with a log-in request to the phone call management system 50. By contrast, if the terminal 10 is a general-purpose terminal such as a PC or a smartphone, the log-in request unit 77 transmits a communication ID and a password as user-specific identification information along with a log-in request to the phone call management system 50.

The log-in request unit 77 also receives a response to the log-in request from the phone call management system 50. In this case, the log-in request unit 77 receives an authentication result ("success" or "failure"). Further, if the authentication result is a "success", the log-in request unit 77 receives function names of functions available for the terminal 10. When the log-in request unit 77 receives the function names, the log-in request unit 77 sends the function names and an instruction to display the function names on a screen to the display control unit 74.

FIG. 13 shows function names displayed on the display unit 75 by the display control unit 74 in accordance with the instruction from the log-in request unit 77. For example, the user can select one of functions (applications) on this screen and cause the terminal 10 to execute a desired function.

<<Operation Example>>

Processes and operations of the phone call system 1 according to the embodiment of the present invention are described with reference to FIGS. 15-18.

Figure 15:
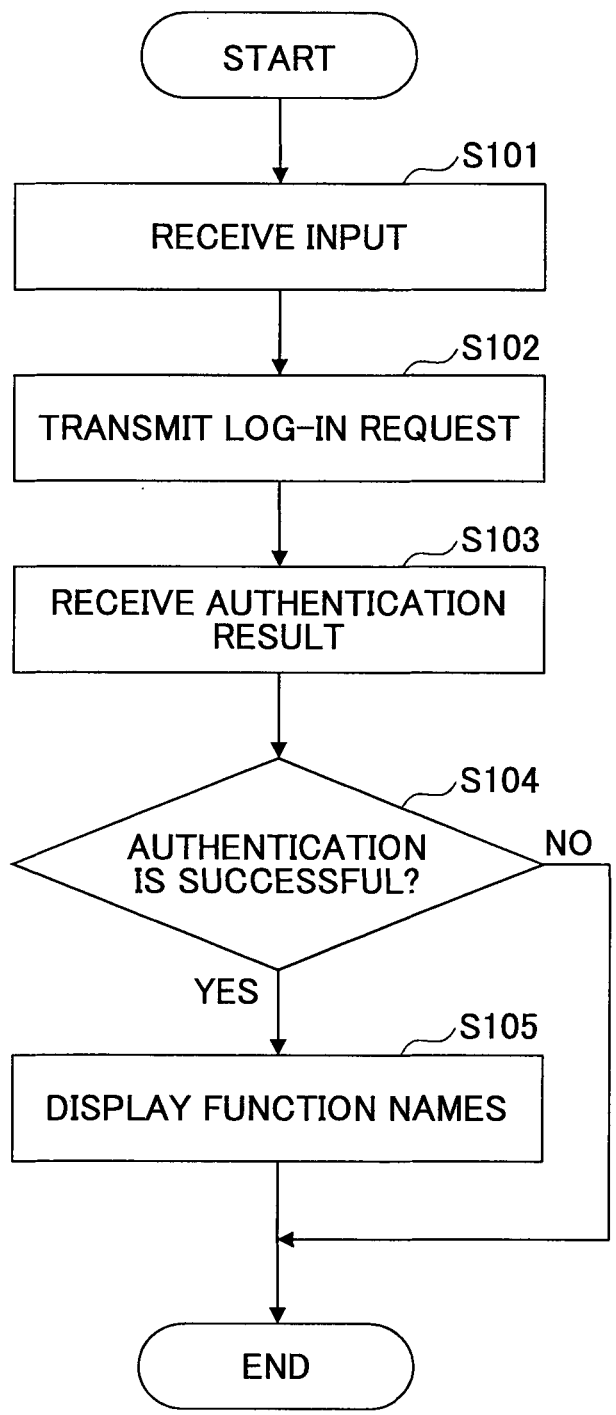
FIG. 15 is a flowchart showing a flow of a process performed by a terminal according to an embodiment of the present invention.

FIG. 15 is a flowchart showing a flow of a process performed by the terminal 10 according to the present embodiment. In the following description, it is assumed that when a certain user powers on the terminal 10aa for a conference having the case 1100 shown in FIG. 4, the terminal 10aa automatically transmits a log-in request to the phone call management system 50.

First, the input reception unit 76 receives an input operation of the power supply switch 109 of FIG. 4 by the user and reports the power-on to the log-in request unit 77 (step S101). Next, the log-in request unit 77 transmits a log-in request along with a communication ID and a password to the phone call management system 50 (step S102). Then an authentication process and a function specification process are performed by the phone call management system 50.

The log-in request unit 77 receives an authentication result in response to the log-in request (step S103). If the authentication is successful, the log-in request unit 77 receives an authentication result indicating that the authentication is successful along with function names of functions available for the terminal 10aa. If the authentication is not successful, the log-in request unit 77 receives an authentication result indicating that the authentication is not successful.

The log-in request unit 77 determines whether the received authentication result indicates that the authentication is successful (step S104). If the authentication is successful (Yes in step S104), the log-in request unit 77 instructs the display control unit 74 to display the received function names on the display screen 120 (step S105). If the authentication is not successful (No in step S104), the process ends.

Figure 16:
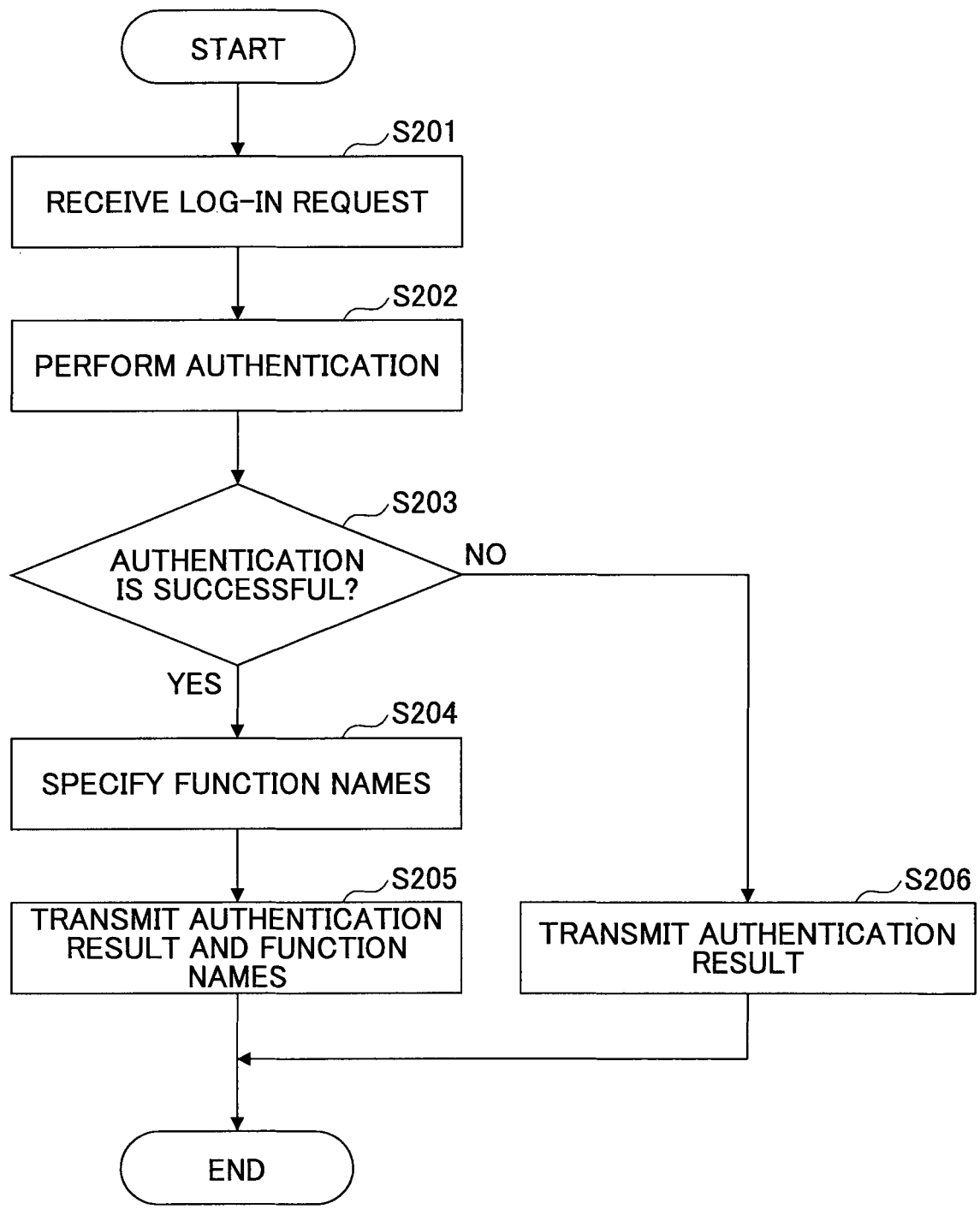
FIG. 16 is a flowchart showing a flow of a process performed by a phone call management system according to an embodiment of the present invention.

FIG. 16 is a flowchart showing a flow of a process performed by the phone call management system 50 according to the present embodiment. In the following process, the phone call management system 50 responds to the log-in request transmitted from the terminal 10aa in step S102 shown in FIG. 15.

First, the authentication unit 62 receives the log-in request from the terminal 10aa via the communication unit 52 (step S201). The authentication unit 62 receives the communication ID and the password along with the log-in request. Next, the authentication unit 62 authenticates the terminal 10aa by comparing a pair of the received communication ID and password with a pair of a communication ID and a password registered with the authentication DB 55 to see if the pairs match (step S202).

Next, the authentication unit 62 determines whether the authentication of the terminal 10aa is successful (namely, whether the pair of the received communication ID and password matches the pair registered with the authentication DB 55) (step S203). If the authentication is successful (Yes in step S203), the function specification unit 63 specifies function names of functions available for the terminal 10aa (step S204). Then the authentication unit 62 transmits an authentication result indicating that the authentication is successful and the specified function names to the terminal 10aa (step S205). If the authentication is not successful (No in step S203), the function specification unit 63 transmits an authentication result indicating that the authentication is not successful to the terminal 10aa (step S206).

Figure 17:
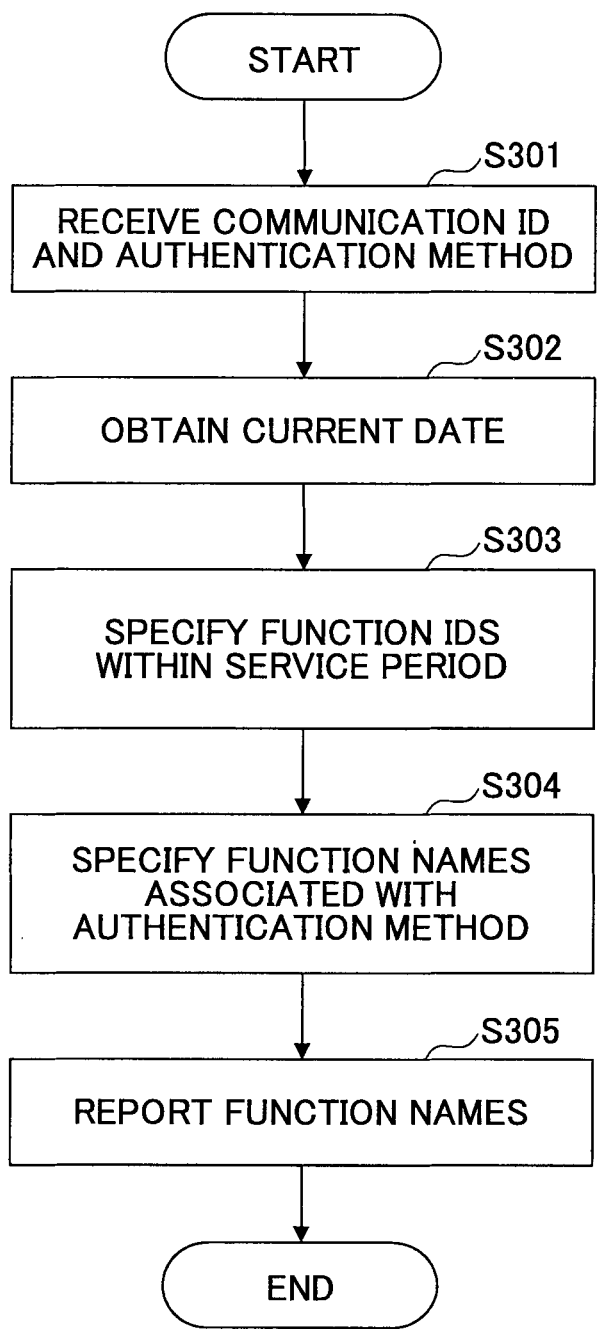
FIG. 17 is a flowchart showing details of a flow of a process performed by a phone call management system according to an embodiment of the present invention.

FIG. 17 is a flowchart showing details of a flow of a process performed by the function specification unit 63 in step S204 of FIG. 16. In the example shown in FIG. 17, a service period in the service period management DB 57 and an authentication method in the function management DB 56 are used in order to specify the function names of functions available for the terminal 10aa.

First, the function specification unit 63 receives the communication ID and the authentication method ("terminal" or "user") from the authentication unit 62 (step S301). Next, the function specification unit 63 obtains the current date (step S302). Next, the function specification unit 63 refers to the service period management DB 57 to specify, from function IDs associated with the received communication ID, function IDs that include the current date in their service periods (step S303).

Further, the function specification unit 63 refers to the function management DB 56 to further specify, from the specified function IDs, those function IDs associated with the authentication method received from the authentication unit 62 and specify function names thereof (step S304). The function specification unit 63 reports the specified function names to the authentication unit 62 (step S305).

In the example shown in FIG. 17, the function specification unit 63 specifies the function names of functions available for the terminal 10aa by using the service period in the service period management DB 57 and the authentication method in the function management DB 56. However, the function specification unit 63 may specify the function names by using only one of the service period and the authentication method or may specify the function names by using another condition.

Figure 18:
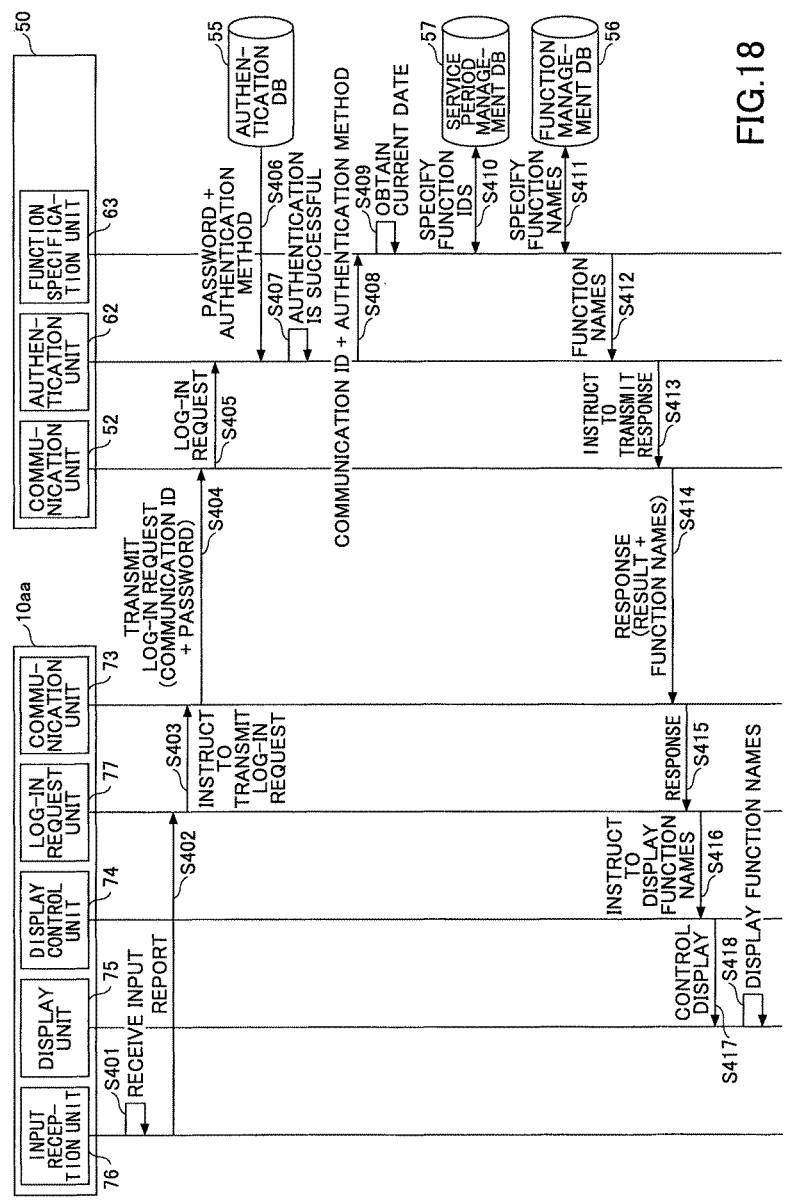
FIG. 18 is a sequential diagram showing an operation of a phone call system according to an embodiment of the present invention.

FIG. 18 is a sequential diagram showing an operation of the phone call system 1 according to the present embodiment. In the following, the terminal 10aa logs into the phone call management system 50 and receives a report of available functions.

First, the input reception unit 76 of the terminal 10aa receives an input operation of the power supply switch 109 shown in FIG. 4 by a user (step S401). The input reception unit 76 reposts the power-on to the log-in request unit 77 (step S402). The log-in request unit 77 instructs the communication unit 73 to transmit a log-in request along with a communication ID "01aa" and a password "0x0x0x0x" to the phone call management system 50 (step S403). The communication unit 73 transmits the log-in request to the phone call management system 50 (step S404).

The communication unit 52 of the phone call management system 50 receives the log-in request and sends the received log-in request to the authentication unit 62 (step S405). The authentication unit 62 searches the authentication DB 55 using the received communication ID "10aa" as a search key and retrieves a password "0x0x0x0x" registered with the authentication DB 55 (step S406). The authentication unit 62 can also retrieve an authentication method "terminal". Since the received password matches the password retrieved from the authentication DB 55, the authentication unit 62 determines that the authentication is successful (step S407). The authentication unit 62 sends the communication ID "01aa" received along with the log-in request and the authentication method "terminal" retrieved from the terminal management DB 54 to the function specification unit (step S408). The function specification unit 63 obtains the current date "2014/02/28" (step S409).

Then, the function specification unit 63 refers to the service period management DB 57 to specify function IDs "1" and "2" that include the current date "2014/02/28" in their service periods from function IDs associated with the received communication ID "01aa" (step S410).

Further, the function specification unit 63 refers to the function management DB 56 to further specify, from the specified function IDs, function IDs "1" and "2" associated with the authentication method "terminal" received from the authentication unit 62, thereby specifying function names thereof, namely, a "Phone call app" and a "Screen sharing app" (step S411). Then the function specification unit 63 reports the specified function names to the authentication unit 62 (step S412).

The authentication unit 62 instructs the communication unit 52 to transmit, to the terminal 10aa, an authentication result indicating that the authentication is successful and the specified function names as a response to the log-in request (step S413). The communication unit 52 transmits the response including the authentication result and the specified function names to the terminal 10aa (step S414).

The communication unit 73 of the terminal 10aa receives the response and sends the received response to the log-in request unit 77 (step S415). The log-in request unit 77 instructs the display control unit 74 to display the function names included in the response on a screen (step S416). The display control unit 74 controls the display unit 75 to display the function names on the display screen 120 in accordance with the instruction (step S417). The display unit 75 displays the function names, namely, the "Phone call app" and the "Screen sharing app" by displaying a screen as shown in FIG. 13 (step S418).

<<Effects>>

The phone call system 1 according to the present embodiment makes it possible to control details of functions available for a terminal connected to a teleconference system. Specifically, with the phone call system 1 according to the present embodiment, a vendor that provides functions available for terminals can sell a license to use the functions for a predetermined period to users of the terminals and can control availability of the functions according to the license.

The present invention is not limited to the specifically disclosed embodiments, but various variations and modifications may be made without departing from the scope of the present invention.

The present application is based on and claims the benefit of priority of Japanese Priority Application No. 2014-100859 filed on May 14, 2014 with the Japanese Patent Office, the entire contents of which are hereby incorporated by reference.

DESCRIPTION OF THE REFERENCE NUMERALS 1 phone call system
50 phone call management system
51 storage unit
52 communication unit
53 control unit
54 terminal management DB
55 authentication DB
56 function management DB
57 service period management DB
58 group management DB 61 storing/reading process unit
62 authentication unit
63 function specification unit
64 period management unit
71 storage unit
72 storing/reading process unit
73 communication unit
74 display control unit
75 display unit
76 input reception unit
77 log-in request unit

The invention claimed is:

1. A management system for managing at least one application to be executed in a particular communication terminal, the management system comprising:
   a receiver configured to receive, from the particular communication terminal, identification information identifying the particular communication terminal;
   a memory that stores a service start date field and a service end date field for each application of a plurality of applications associated with pieces of identification information identifying communication terminals, wherein a service time period is determined by analyzing the service start date field and the service end date field, and indicates a time period during which the application is permitted to be used, wherein when the service end date field is set equal to a predetermined value, processing circuitry of the management system determines that the service time period has no time limit;
   the processing circuitry configured to (1) identify, by accessing the memory, all applications associated with the received identification information identifying the particular communication terminal, and (2) determine, from among the identified applications, particular applications whose corresponding service time period includes a current date; and
   a transmitter that, in order for a user to select one of the determined applications, transmits, to the particular communication terminal via a network, information defining a screen to be displayed including respective icons corresponding to items of application information indicating the determined applications.

2. The management system as claimed in claim 1, wherein the identification information is terminal identification information assigned to the particular communication terminal or user identification information assigned to a user of the particular communication terminal, the terminal identification information being for a conference-only terminal and the user identification information being for a general-purpose terminal.

3. The management system as claimed in claim 2, wherein the processing circuitry is further configured to determine the particular applications depending on whether the identification information is the terminal identification information or the user identification information.

4. The management system as claimed in claim 1,
   wherein the processing circuitry is further configured to authenticate the particular communication terminal in response to a log-in request from the particular communication terminal,
   the receiver is further configured to receive the identification information along with the log-in request from the particular communication terminal, and
   the transmitter is further configured to transmit the information defining the screen to the particular communication terminal when the particular communication terminal is successfully authenticated.

5. The management system as claimed in claim 1, wherein the service time period of each application is set based on a group of at least one communication terminal including the particular communication terminal.

6. The management system as claimed in claim 1, wherein each application is one of a phone call application, a screen sharing application, a device connection application, and a chat application.

7. A non-transitory computer-readable recording medium storing a computer-readable program that, when executed by a computer for managing at least one application to be executed in a particular communication terminal, causes the computer to perform a process, the process comprising:
   receiving, from the particular communication terminal, identification information identifying the particular communication terminal;
   identifying, by accessing a memory, all applications of a plurality of applications in the memory associated with the received identification information identifying the particular communication terminal, and determining, from among the identified applications, particular applications whose corresponding service time period includes a current date, the memory storing a service start date field and a service end date field for each application of the plurality of applications associated with pieces of identification information identifying communication terminals, wherein the service time period is determined by analyzing the service start date field and the service end date field, and indicates a time period during which the application is permitted to be used, wherein when the service end date field is set equal to a predetermined value, the process includes determining that the service time period has no time limit; and
   in order for a user to select one of the determined applications, transmitting, to the particular communication terminal via a network, information defining a screen to be displayed including respective icons corresponding to items of application information indicating the determined applications.

8. A management method performed by a management system that manages at least one application to be executed in a particular communication terminal, the management method comprising:
   receiving, from the particular communication terminal, identification information identifying the particular communication terminal;
   identifying, by accessing a memory, all applications of a plurality of applications in the memory associated with the received identification information identifying the particular communication terminal, and determining, from among the identified applications, particular applications whose corresponding service time period includes a current date, the memory storing a service start date field and a service end date field for each application of the plurality of applications associated with pieces of identification information identifying communication terminals, wherein the service time period is determined by analyzing the service start date field and the service end date field, and indicates a time period during which the application is permitted to be used, wherein when the service end date field is set equal to a predetermined value, the method includes determining that the service time period has no time limit; and in order for a user to select one of the determined applications, transmitting, to the particular communication terminal via a network, information defining a screen to be displayed including respective icons corresponding to items of application information indicating the determined applications.

* * * * *